Dec. 15, 1925.
G. A. ANDEREGG
1,565,613
ELECTRICAL MEASURING APPARATUS
Filed Feb. 10, 1923
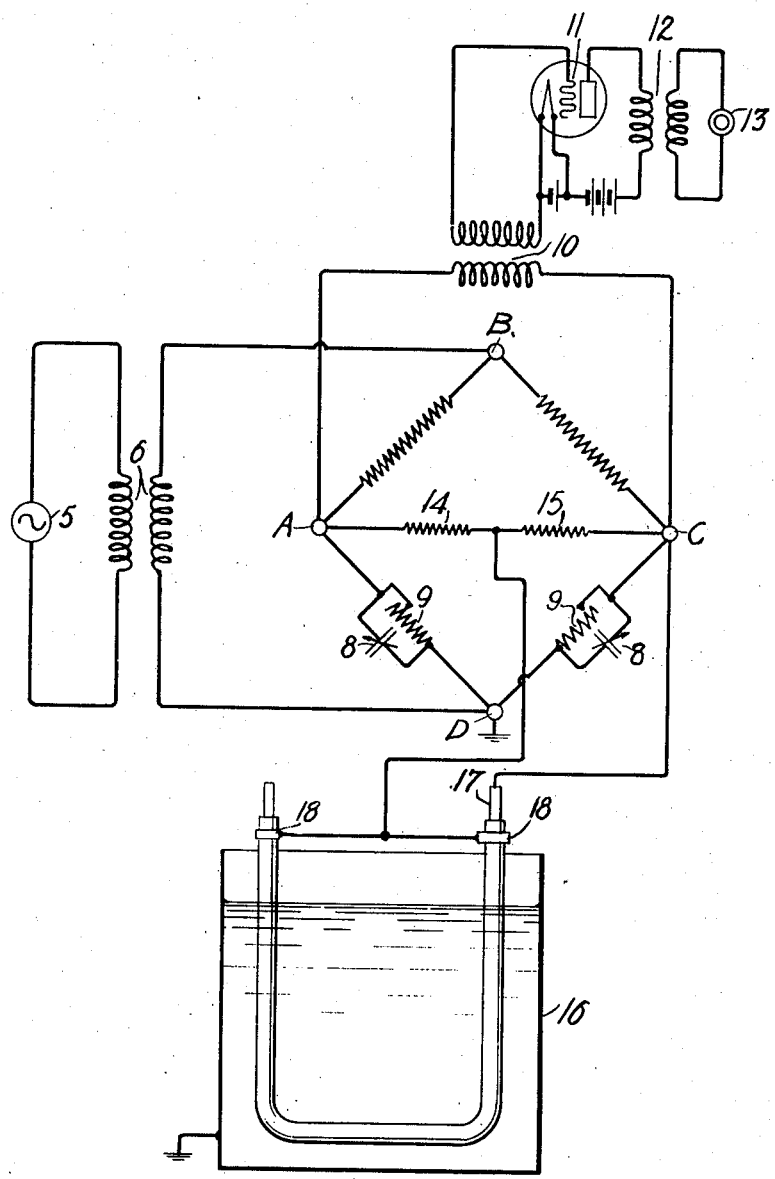
Inventor:
Gustavus A. Anderegg
by C.A. Sprague. Atty Patented Dec. 15, 1925.

1,565,613

UNITED STATES PATENT OFFICE.

GUSTAVUS A. ANDEREGG, OF BLACKHEATH, ENGLAND, ASSIGNOR TO WESTERN ELECTRIC COMPANY, INCORPORATED, OF NEW YORK, N. Y., A CORPORATION OF NEW YORK.

ELECTRICAL MEASURING APPARATUS.

Application filed February 10, 1923. Serial No. 618,426.

*To all whom it may concern:*

Be it known that I, GUSTAVUS A. ANDEREGG, a citizen of the United States, residing at Blackheath, S. E. 3, England, have invented certain new and useful Improvements in Electrical Measuring Apparatus, of which the following is a full, clear, concise, and exact description.

This invention relates to electrical measuring apparatus and especially to means for determining the electrical capacity and conductance of cables or cable cores when subjected to conditions of extreme humidity, to other conditions causing surface leakage.

It is the principal object of the invention to provide suitable means for use in connection with the testing of rubber or gutta percha insulated conductors whereby errors due to leakage from the conductor over the surface of the insulation may be controlled or eliminated. When used in cables such insulated conductors form the core.

In the measurement of capacity and conductance with alternating currents of telephone frequency by means of a bridge considerable difficulty is sometimes experienced because of current leakage from the conductor over the ends of the insulation to the water in which the core is submerged. This leakage tends to produce errors in the measurement of capacity and even more serious errors in the measurement of dielectric conductance. Furthermore, the varying insulation resistance is confusing and prevents obtaining a sharp balance.

In accordance with a feature of this invention a guard ring combined with a pair of balanced impedances is associated with an alternating current Wheatstone bridge in such a manner that the errors due to surface leakage are practically eliminated and it becomes possible to obtain a sharp balance and what is more important; correct measurements even under conditions of adverse humidity.

The invention may be more clearly understood by reference to the accompanying drawing in which the single figure illustrates schematically a testing bridge arranged in accordance with the features of this invention.

The source of alternating current 5 used for testing purposes is connected through the transformer 6 to the terminals BD of a Wheatstone bridge comprising the equal fixed ratio arms AB and BC and the variable arms AD and CD. The function of the transformer 6 is to prevent any electrostatic disturbance originating at the source of current 5 from interfering with the balancing of the bridge. The arms AB and BC may consist of balanced non-inductive resistances which may for example be 1000 ohms each. The arms AD and CD may contain variable capacities 8—8 and variable resistances 9—9 together with switching means for shifting variable portions of the capacity from one arm to the other always keeping the total capacity in the two arms unchanged, and means for varying one or both of the resistances 9—9. For the sake of clearness the switching means is not shown in the drawing since it is not involved in the present invention. Connected to the terminals A and C is a suitable transformer 10 which is connected to the input side of the amplifier 11. The output side of the amplifier is connected through a step-down transformer 12 to a telephone receiver 13. In connection with a large portion of the testing for which this bridge is employed, the use of an amplifier is unnecessary, in which case the receiver 13 is connected directly across the secondary winding of transformer 10.

Balanced impedances 14 and 15 which may be for example 1000 ohms resistance each are connected in series between the bridge terminals A and C. The cable or core to be tested is immersed in the tank 16 which is grounded and the conductor 17 under test is connected either to terminal A or terminal C as shown and a balance made for either connection. Since the bridge terminal D is grounded and the water in contact with the outer surface of the cable or core is grounded through the tank 16, the capacity and conductance between the conductor and the sheath or water in contact with the outer surface of the core is connected in either bridge arm AD or arm CD. Connected to the common point of the resistances 14 and 15 are the guard rings 18—18 which may consist of metal or other conducting material in close contact with the outer surface of the insulation of the core to prevent leakage currents over the surface of the insulation from destroying the accuracy of the balance.

When measuring capacity and conductance with this arrangement the bridge is first accurately balanced by varying the capacity and conductance in arms AD and CD, until there is no sound in the receiver 13, thus indicating zero potential difference between terminals A and C and consequently equal impedances in the arms AD and DC. The conductor under test is then connected to either terminal C or terminal A (assume the former), and a second balance determined by transferring capacity units from arm CD to arm AD, and adjusting one or both of the resistances 9—9, until there is no sound in the receiver 13, thus indicating that sufficient capacity and conductance adjustments have been made to compensate for the capacity and conductance of the conductor under test. By noting the change in adjustment of the capacity and conductance units, one is able to determine the capacity and conductance values. For the purpose of making a check on this measurement, the conductor 17 may be connected to terminal A and another balance determined by shifting capacity from arm AD to arm CD and readjusting the resistance units. The admittance from the water to the guard rings is connected from terminal D to the common point of the balanced resistances 14 and 15. The admittance between the guard rings and conductor 17 is connected from the common point of the balanced resistances 14 and 15 to either terminal A or C. By choosing the resistances 14 and 15 so that they represent admittances which are large by comparison with those from the guard ring to the water and to conductor 17, the effect of these latter admittances on the bridge balance may be made negligibly small.

In the arrangement described, the fixed ratio arms are of equal resistance and the resistances 14 and 15 are carefully balanced. The principle of operation, however, is equally applicable for use with bridges having inequality ratio arms provided the resistances 14 and 15 are adjusted to a corresponding ratio. Thus the ratio of resistance 14 to resistance 15 should be the same as the ratio of arm AB to arm BC.

By means of such an arrangement, it is possible to make accurate measurements under adverse humidity conditions, where without special precautions it might be impossible to secure accurate results or even to obtain a satisfactory balance.

Although the principle of operation is particularly suitable for use in connection with an alternating current bridge adapted for making capacity and conductance measurements, the principle of operation can in certain cases be applied in making conductance tests with a direct current Wheatstone bridge, in which case a source of direct current such as a battery is used to replace the source of alternating current, the condensers in the variable arms may be omitted, and a suitable indicating device, such for example, as a galvanometer is used to replace the telephone receiver.

What is claimed is:

1. In an electrical measuring device, a Wheatstone bridge and means, including a balanced circuit, associated therewith to eliminate excessive errors due to surface leakage over the material to which the measuring device is applied.

2. In an electrical measuring device for measuring the conductance of an insulating material, a Wheatstone bridge, and means, including a balanced circuit, associated therewith to eliminate excessive errors resulting from surface leakage over the insulating material.

3. In an electrical measuring device for measuring electrical constants of a core, a Wheatstone bridge, and means, including a balanced circuit, associated therewith to eliminate excessive errors resulting from surface leakage over the insulation of the core.

4. In a device for measuring the constants of an electrical core, the combination of an alternating current bridge with means, including a balanced circuit, for eliminating errors due to surface leakage over the core insulation.

5. In an electrical measuring device comprising a Wheatstone bridge having fixed and variable arms, a pair of balancing resistances connected in series between conjugate points of the bridge, and a guard ring connected to the common point of said resistances.

6. In an electrical measuring device for measuring the constants of a core, a testing bridge including a pair of fixed ratio arms, a pair of variable arms, and means for determining when said bridge is balanced, a pair of balancing resistances connected in series between junction points of said fixed and variable arms, and a guard ring secured to the core under test and connected to the common point of said resistances.

7. In a device for measuring the constants of an electrical core, the combination of an alternating current bridge including fixed and variable arms, with means for eliminating errors due to surface leakage over the core insulation, said means including a guard ring secured to the core and connected to the common point of a pair of balancing resistances connected in series between conjugate points of said bridge.

8. In a device for measuring the constants of an electrical core, an alternating current bridge including fixed and variable arms, a pair of resistances connected in series between conjugate points of the bridge, and a guard ring secured to the surface of the core and connected to the common point of said resistances, the ratio of said resistances to each other being equal to the ratio of the fixed bridge arms.

9. In a device for measuring the constants of an electrical core, the combination of an alternating current bridge with means, including a balanced circuit connected across said bridge, for preventing surface leakage over the insulation of the core from interfering in obtaining a sharp balance of the bridge.

10. In a device for measuring the constants of an electrical core, the combination of an alternating current bridge with means for eliminating errors due to surface leakage over the core insulation, said means including a pair of balancing series resistances connected across said bridge and a guard ring secured to the core and connected to the bridge in such a manner that errors due to surface leakage are practically eliminated.

In witness whereof, I hereunto subscribe my name this 30th day of January A. D., 1923.

GUSTAVUS A. ANDEREGG.